(12) United States Patent
Vugts

(10) Patent No.: US 10,650,711 B2
(45) Date of Patent: May 12, 2020

(54) SYSTEMS AND METHODS FOR PROJECTING MULTIPLE IMAGES ON A COMMON AREA OF AN OUTER SURFACE OF A HOUSING

(71) Applicant: KONINKLIJKE PHILIPS N.V., Eindhoven (NL)

(72) Inventor: Marinus Arnoldus Martinus Vugts, Beetsterzwaag (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/087,673

(22) PCT Filed: Mar. 21, 2017

(86) PCT No.: PCT/IB2017/051615
§ 371 (c)(1),
(2) Date: Sep. 24, 2018

(87) PCT Pub. No.: WO2017/163173
PCT Pub. Date: Sep. 28, 2017

(65) Prior Publication Data
US 2019/0103045 A1    Apr. 4, 2019

Related U.S. Application Data

(60) Provisional application No. 62/311,982, filed on Mar. 23, 2016.

(51) Int. Cl.
*G09F 13/04* (2006.01)
*G09F 23/00* (2006.01)
(Continued)

(52) U.S. Cl.
CPC .......... *G09F 23/0075* (2013.01); *A61C 17/16* (2013.01); *G09F 13/22* (2013.01); *A46B 2200/1066* (2013.01); *G09F 2013/222* (2013.01)

(58) Field of Classification Search
USPC ..................................... 340/815.45, 815.69
See application file for complete search history.

(56) References Cited

U.S. PATENT DOCUMENTS 6,567,010 B1 * 5/2003 Lin ..................... G08G 1/095
340/815.45
2005/0195614 A1   9/2005 Bayersdorfer
(Continued)

FOREIGN PATENT DOCUMENTS

WO   2006116728 A2   11/2006
WO   2009101557 A1   8/2009

*Primary Examiner* — Brent Swarthout

(57) ABSTRACT

A power device comprising: multiple light sources (202A, 202B, 202C) arranged in a housing (205); a mask (204) arranged around each of the multiple light sources in the housing and including multiple chambers (207A, 207B, 207C) corresponding to the multiple light sources to direct light (214A, 214B, 214C) emitted from the multiple light sources to a common area (140, 216) on an outer surface of the housing; and multiple image sources (214A, 214B, 214C) corresponding to the multiple light sources arranged between the multiple light sources and the outer surface of the housing, light emitted from each of the multiple light sources reaching a corresponding image source before reaching the surface of the housing and projecting a corresponding image (212) on the common area on the surface of the housing.

10 Claims, 9 Drawing Sheets

(51) Int. Cl.
*G09F 13/22* (2006.01)
*A61C 17/16* (2006.01)

(56) References Cited

U.S. PATENT DOCUMENTS

| | | |
|---|---|---|
| 2007/0235308 A1 | 10/2007 | Sharrah |
| 2010/0097212 A1 | 4/2010 | Wingate et al. |
| 2011/0232012 A1 | 9/2011 | Nanda |
| 2012/0092623 A1 | 4/2012 | Huebner |
| 2013/0314900 A1* | 11/2013 | Timmerman ............ G09F 13/04 362/97.1 |
| 2013/0329197 A1* | 12/2013 | Backes .................. G03B 21/08 353/97 |
| 2015/0159843 A1 | 6/2015 | Chien |
| 2015/0187046 A1* | 7/2015 | Sawachi .................. G02B 7/36 345/581 |
| 2015/0343946 A1* | 12/2015 | Backes .................. B60K 35/00 362/520 |
| 2017/0099940 A1* | 4/2017 | Gottlieb ................. A46B 9/026 |

* cited by examiner

"OFF"  "Icon 1 ON"  "Icon 2 ON"

"OFF"         "Icon 1 ON"

"Icon 2 ON"

"Icon 3 ON"

"OFF"

"Icon 1 ON"

"Icon 1 & 2 ON"

"Folded open" view

"Closed" view

Cross section of display mask

SYSTEMS AND METHODS FOR PROJECTING MULTIPLE IMAGES ON A COMMON AREA OF AN OUTER SURFACE OF A HOUSING

FIELD OF THE INVENTION

The present disclosure generally relates to systems and methods for directing light emitted from multiple light sources within a housing through respective multiple image sources to project one or more images on a common area of an outer surface of the housing.

BACKGROUND

Several types of display systems for various electronic devices exist. For example, conventional display systems for power toothbrushes include white or color displays created by laser ablation. Other display systems for electronic devices include projected displays in white or red, for example, on a face of an alarm clock.

However, such display systems are limited in display dynamics and/or use a relatively large "user interface real estate," and each of the display system elements are limited to being separately projected adjacent to one another. Conventional display systems simply do not provide the capability to display multiple icons or other designs at exactly the same spot or common area of a (white or color coated/painted) device. This can be problematic, especially in circumstances where one would like to display multiple icons on the surface of a single device with limited "user interface real estate," such as on certain power hand-held devices.

Accordingly, there is a need in the art for systems and methods for directing light emitted from multiple light sources within a housing through respective multiple image sources to project one or more images on a common area of an outer surface of the housing.

SUMMARY OF THE INVENTION

The present disclosure is directed to inventive systems and methods for directing light emitted from multiple light sources within a housing through chambers (one or more of which may be angled) formed by masks and through respective multiple image sources to project one or more images on one common area of an outer surface of the housing (either simultaneously or sequentially) that can be a white or color painted body. For example, a combination of first and second projected images can create a dynamic blended image on the common area on the surface. Alternatively, the first image can fade out while the second image fades in on the common area. Further, the second image can be projected on the common area on the surface after the projection of first image on the common area has stopped. Stacked images/icons can also be projected in multicolor. The projection can take place on the "skin" of the outer housing, where the skin is created by a paint or matt texture etc. (as should be appreciated by a person of ordinary skill in the art in conjunction with a review of this disclosure).

The housing can be part of any power device (hand-held or non-hand-held) such as health care devices and dental/oral care devices including power toothbrushes. Using the embodiments and implementations herein, brushing behavior and cleaning of teeth, for example, can be substantially improved and a user can stay informed regarding the status of his/her power toothbrush.

In some embodiments, an image can be projected on an outer surface of a housing that at least partially wraps around the curved outer surface of housing (where the housing is at least partially curved). This "wrapping" feature can be accomplished by a mask arrangement that directs light emitted from the multiple light sources in a diverging manner to separate areas on the curved outer surface of the housing. Stated differently, the masks that surround and form the chambers that house each of the light sources can be angled in a particular manner/configuration within the housing to provide the "wrapping" feature (by, in part, projecting an image corresponding to an image source in separate areas on the curved outer surface of the housing).

Generally in one aspect, a power device includes: a power toothbrush; multiple light sources arranged in a housing; a mask arranged around each of the multiple light sources in the housing and including multiple chambers corresponding to the multiple light sources to direct light emitted from the multiple light sources to a common area on an outer surface of the housing; and multiple image sources corresponding to the multiple light sources arranged between the multiple light sources and the outer surface of the housing, light emitted from each of the multiple light sources reaching a corresponding image source before reaching the surface of the housing and projecting a corresponding image on the common area on the surface of the housing.

According to an embodiment, the multiple light sources are arranged on a flat substrate within the housing.

According to an embodiment, the multiple light sources are light emitting diodes having limited angle dependent intensity profiles.

According to an embodiment, the power device further includes a controller configured to selectively emit light from one or more of the multiple light sources to selectively project different images of the multiple image sources on the common area on the outer surface of the housing.

According to an embodiment, the controller is configured to emit light from two or more of the multiple light sources to project a blended image on the common area on the outer surface of the housing.

According to an embodiment, the controller is configured to (i) fade-out light emitted from a first of the multiple light sources corresponding to a first image of the multiple image sources and (ii) fade-in light from a second of the multiple light sources corresponding to a second image of the multiple image sources to create a fade effect from the first image to the second image on the common area on the outer surface of the housing.

Generally in one aspect, a power device includes: multiple light sources arranged in a housing having a curved outer surface; a mask arranged around each of the multiple light sources in the housing and including multiple chambers corresponding to the multiple light sources to direct light emitted from the multiple light sources in a diverging manner to separate areas on the curved outer surface of the housing; and multiple image sources corresponding to the multiple light sources arranged between the multiple light sources and the curved outer surface of the housing, light emitted from each of the multiple light sources reaching a corresponding image source before reaching the curved outer surface of the housing and projecting a corresponding image on the separate areas on the curved outer surface of the housing.

According to an embodiment, the multiple light sources are arranged on a flat substrate within the housing.

According to an embodiment, the multiple light sources are light emitting diodes having limited angle dependent intensity profiles.

According to an embodiment, multiple images being projected on the curved outer surface of the housing results in a combined image that wraps around the curved outer surface.

Generally in one aspect, a method for selectively displaying images on a surface of a housing, including the steps of: providing a housing containing (i) multiple light sources, (ii) a mask arranged around each of the multiple light sources and including multiple chambers corresponding to the multiple light sources to direct light emitted from the multiple light sources to a common area on the surface, and (iii) multiple image sources corresponding to the multiple light sources arranged between the multiple light sources and the surface; and causing light to be emitted from a first of the multiple light sources, the emitted light reaching a corresponding first image source before reaching the surface and projecting a corresponding first image on the common area on the surface.

According to an embodiment, the method further comprises the step of causing light to be emitted from a second of the multiple light sources, the emitted light reaching a corresponding second image source before reaching the surface and projecting a corresponding second image on the common area on the surface, the combination of the first and second images creating a blended image on the common area on the surface.

According to an embodiment, the method further comprises the steps of causing light to fade-out from the first light source; and causing light to fade-in from a second of the multiple light sources, the emitted light reaching a corresponding second image source before reaching the surface and projecting a corresponding second image on the common area on the surface, creating a fade effect from the first image to the second image on the common area on the outer surface of the housing.

According to an embodiment, the method further comprises the steps of causing light to stop being emitted from the first light source; and causing light to be emitted from a second of the multiple light sources, the emitted light reaching a corresponding second image source before reaching the surface and projecting a corresponding second image on the common area on the surface, creating a switch from the first image to the second image on the common area on the surface.

According to an embodiment, the first image and the second image are identical in shape; the first light source is configured to emit light of a first color; the second light source is configured to emit light of a second color, the first color being different from the second color; and the switch from the first image to the second image results in a change in color of the projected image.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), laser diodes, electroluminescent strips, and the like. It should also be understood that the term LED does not limit the physical and/or electrical package type of an LED.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, and other types of electroluminescent sources.

As used herein for purposes of the present disclosure, the term "controller" is used generally to describe various apparatus relating to the operation of a stream probe apparatus, system, or method. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure is directed to projecting one or more images on a common area of an outer surface of the housing based on the configuration of multiple light sources within chambers formed by masks within the housing. Images can be projected to create stacked icons/images. Instead of projecting the images at an individual spot at a straight angle, icons/images are projected at one and the same spot on the surface of the housing by creating certain individual angular projections with or without an additional lens, and in the same color or different colors. Angular display masks can facilitate the angular projections. Using the various embodiments and implementations herein, projected images on the common area can include brushing information/indications for a user's benefit.

A particular non-limiting goal of utilization of the embodiments and implementations herein is to provide brushing information/indications to a user of a power toothbrush, e.g., a Philips Sonicare™ toothbrush (manufactured by Koninklijke Philips Electronics, N.V.). Such information can, for example, be related to error or alert messages (e.g., battery due to be changed/charged, change brush head), instruction or indications related to proper use of the power toothbrush, timer, sensory result messages (e.g., fully cleaned teeth, partially cleaned teeth, good brushing behavior, poor brushing behavior, plaque formation). According to other embodiments and implementations, pertinent information/indications can be provided to users of any power medical, dental, shaving, grooming, mother and child care devices (handheld and non-handheld), for example, which can incorporate the configurations and functionalities described herein (as should be appreciated by a person of ordinary skill in the art in conjunction with a review of this disclosure).

Advantages of embodiments are illustrated by the following description of an exemplary power toothbrush 100 embodiment including a projected display system 200. However, the particular components, uses, functionalities and amounts thereof recited in this description, as well as other conditions and details, are to be interpreted to apply broadly in the art and should not be construed to unduly restrict or limit the invention in any way.

Figure 1:
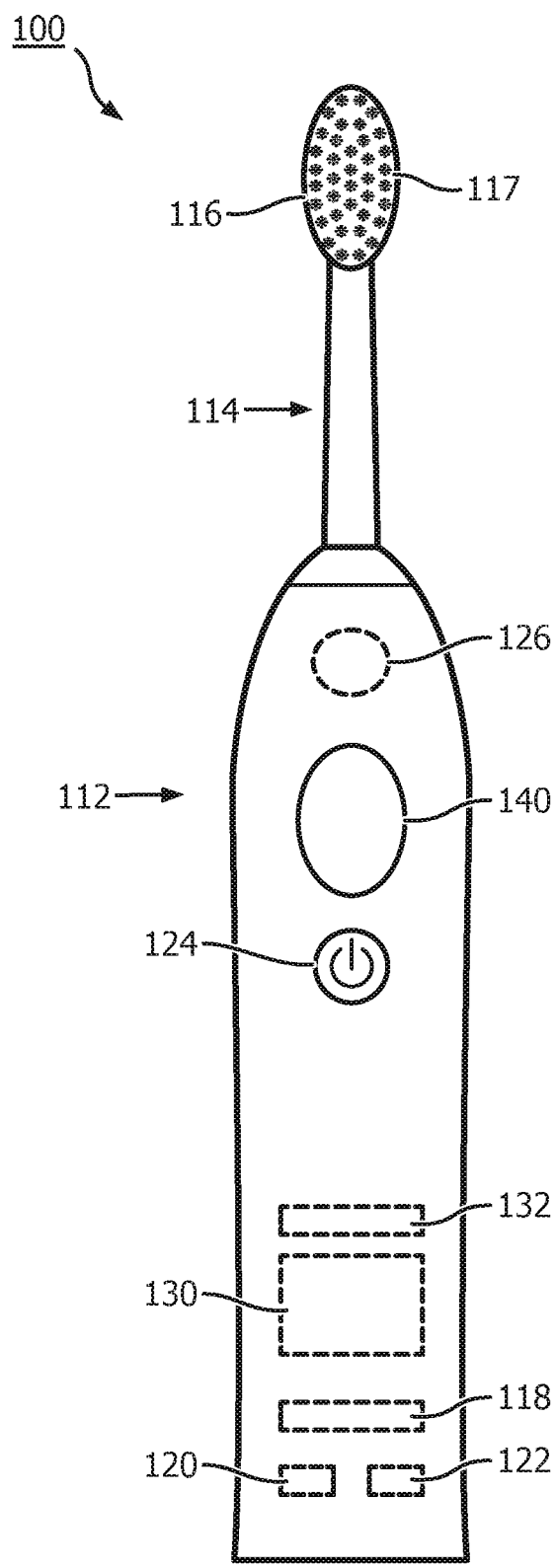
FIG. 1 is a bristle side view of a power toothbrush having a projected display system in accordance with an embodiment.

Turning to FIG. 1, a bristle side view of a power toothbrush is shown, in accordance with an embodiment. The power toothbrush, shown generally at 100, includes in general a body portion 112, a neck portion 114, and a brush head portion 116 with bristles 117. The body portion/handle 112 includes a drive assembly/circuit 118, a control unit 120, and a power source 122 (e.g., battery or power cord) for producing a brush head motion suitable for effective cleaning of teeth. The illustrative elements are shown representationally because they are conventional in the art of power toothbrushes. The operation of the toothbrush itself is controlled by an on/off switch 124. The particular configuration and arrangement shown in FIG. 1 is by way of example only and does not limit the scope of the embodiments disclosed below.

The power toothbrush 100 can include one or more sensors 126 located on or within the toothbrush. Sensor 126 is shown on FIG. 1 near the top of the body portion/handle 112, but may be located anywhere on the device, including for example on the neck portion 114 or brush head portion 116, to sense brushing information. Processor 130 is preferably located within the toothbrush and configured to process sensor information obtained from sensor 126. Display area. 140, which may be located on the toothbrush and associated with a projected display system 200 (discussed further with reference to FIGS. 4-7 below) on and/or within the toothbrush, can be responsive to a processor and configured to communicate brushing information/indications to the user. In some embodiments, a storage system/memory 132 for storing brushing information may be included for further analysis of information.

Many types of sensors can be used with the present disclosure. In some embodiments, for example, a force sensor can be used to detect bristle pressure, load, or force applied against the teeth. Such force sensors can take various forms, including for example, Hall Effect sensors or other known mechanical or magnetic sensors. In other embodiments, a plaque detection sensor can be used to detect the presence of plaque on the teeth. For example, a pressure sensor can be configured to measure feedback from air applied to a dental surface to characterize the dental surface. In some embodiments, a gum detection sensor can be used to detect whether the bristle set is brushing gums rather than teeth. In further embodiments, a MEMS (micro-electro-mechanical system) gyroscope and an accelerometer can be positioned on the brush head to detect rotational velocity of the brush head and orientation of the brush head during the mouth during operation. In other embodiments, infrared sensors can be used to determine the position of the bristle set in the mouth of the user. The particular form of sensor is not an essential part of the present system, as long as the sensor is accurate.

Figure 2:
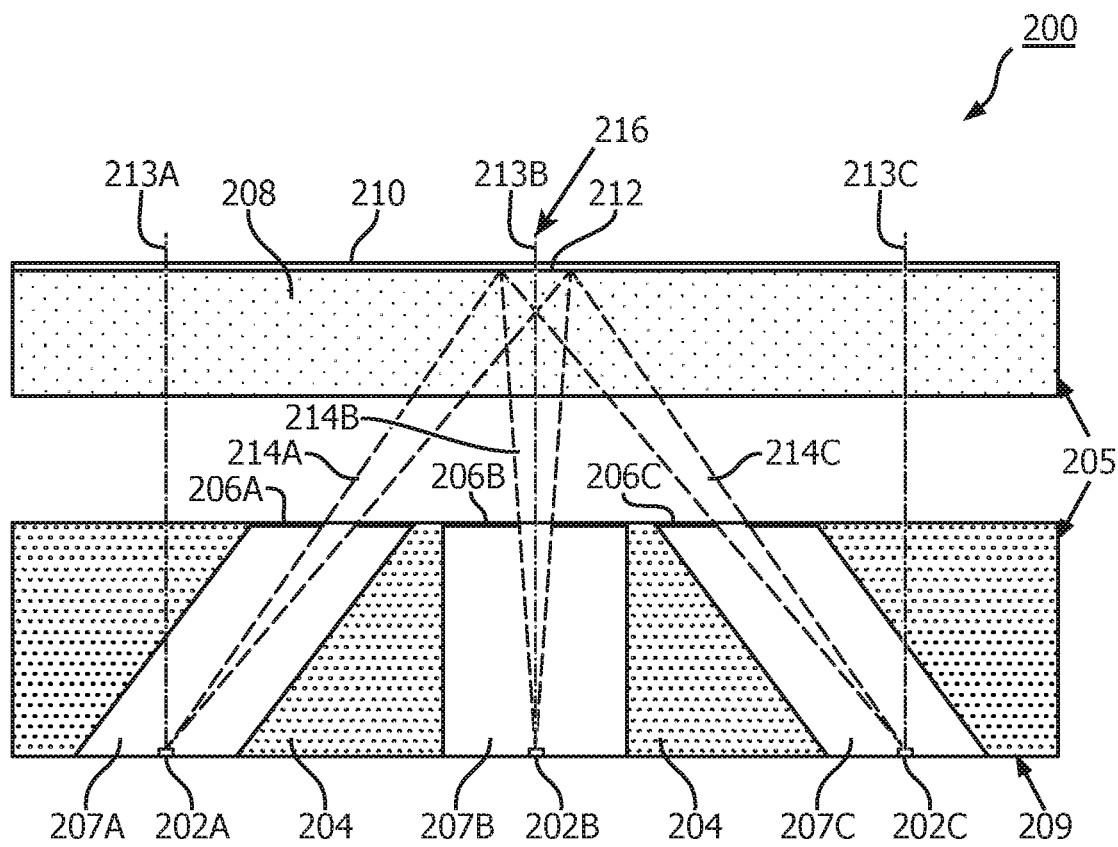
FIG. 2 is a sectional view of a projected display system within a body portion/handle of the power toothbrush taken along A-A of FIG. 1 in accordance with an embodiment.

Referring to FIG. 2, a sectional view of the projected display system 200 within body portion/handle 112 and taken along A-A of FIG. 1 is shown. The projected display system 200 includes one or more LED light sources 202A, 202B, and 202C positioned within a housing 205 on a flat surface or substrate 209. Alternatively, substrate 209 can be a curved substrate such as a flexible PCBA, for example. Each of the LED light sources 202A, 202B, and 202C includes a respective longitudinal access 213A, 213B and 213C, and is surrounded by a mask 204 within housing 205 forming a chamber 207A, 207B, and 207C for each respective LED light source 202A, 202B, and 202C. Chambers 207A and 207C are positioned at an angle to the respective longitudinal axes 213A and 213C from the position of each LED 202A and 202C toward chamber 207B. Chamber 207B is not shown positioned at an angle to the longitudinal access 213B. Although not shown, various combinations of angled and non-angled chambers are contemplated as long as the image projected 212 pursuant to light emitted from multiple LEDs through respective image sources forms on a common area (and not at completely separate positions) on an outer surface of the housing 205 (as shown in FIG. 2 as 216). Alternatively, the common area can be a separate panel of the housing 205, an on/off knob or other function knob (as should be appreciated by a person of ordinary skill in the art in conjunction with a review of this disclosure).

As further shown in FIG. 2, each LED light source 202A and 202C is positioned within respective angled chambers 207A and 207C to project light 214A and 214C emitted from LED light sources 202A and 202C at an angle relative to the respective longitudinal axes 213A and 213C and through respective image sources (e.g., foils) 206A and 206C. The angled chambers 207A and 207C are formed to guide the light emitted from the LED light sources 202A and 202C at the referenced angles to the respective longitudinal axes. Each LED light source 202A and 202C can also be positioned on a surface or substrate that is angled relative to the respective longitudinal axes 213A and 213C (preferably in the same direction of the angled chambers 207A and 207C) within the angled chambers 207A and 207C. LED light source 202B is positioned within chamber 207B to direct light emitted from LED light source 202B along each the longitudinal access 213B and through a foil with an image 206B. The light emitted from each of the LED light sources 202A, 202B and 202C can pass through a carrier 208 and paint system 210 to form a corresponding respective projected image 212 on one common area 216 on an outer surface of the housing 205 as a function of the configuration of the angled chambers 207A and 207C (and, in addition or optionally, via angled surfaces as discussed supra) and non-angled chamber 207B.

According to an embodiment, although an image can be formed/projected on the common area via light emitted from the multiple LED light sources through respective multiple foils, it is contemplated that an image can be formed/projected on the common area by one (or otherwise less than all) of the LED light sources.

According to a further embodiment, additional LED light sources within respective additional angled chambers and respective additional foils are contemplated, for the purpose of providing the option of additional projected images to the one common area or to separate common areas to provide additional indications (e.g., low battery). Moreover, it is contemplated that multiple LEDs and/or multiple foils (stacked, partially stacked or side by side) can be associated with one or more chambers, each of foils can be utilized at the same or at different times.

Figure 3A:
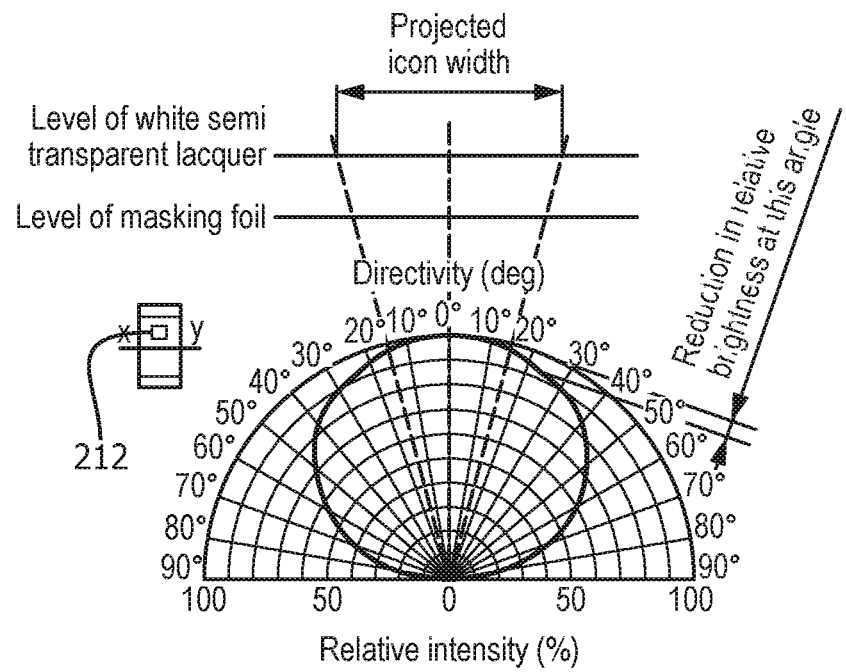
FIG. 3A is a graphical illustration of an angle dependent intensity profile of an LED light source in one direction in accordance with an embodiment.
Figure 3B:
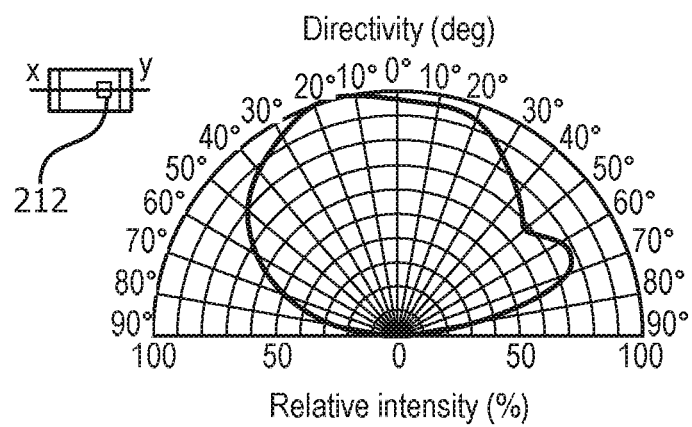
FIG. 3B is a graphical illustration of an angle dependent intensity profile of an LED light source in another direction in accordance with an embodiment.

According to another embodiment, it can be advantageous for the LED light sources to be used with a limited angle dependent intensity profile in two directions so that maximum light intensity/brightness evenness between mixed LED light source projections can be achieved. Referring to FIGS. 3A and 3B, graphical illustrations of an angle dependent intensity profile of an LED light source in two directions and the effect on projected image/icon intensity are shown. Directivity of the emitted light which is used to project the image is shown vs. relative intensity, with the level of the masking foil, the level of the white semitransparent lacquer, and the projected icon/image profile/width being shown. A particular 30 degree range of light emission angle is shown as ideal for an advantageous maximum light intensity/brightness evenness, which would provide the widest and most advantageous projected icon/image profile. Anything greater than this 30 degree range shows a reduction in relative brightness, although could still be used.

For example, as shown in FIG. 3A, in order to obtain the widest profile for the projected icon/image possible while maintaining maximum light intensity/brightness evenness between mixed LED light source projections, an LED light source can be angled 15 degrees one way or the other in one plane from a zero position (where the zero position is directly aimed at a common area as is LED light source 202B along longitudinal axis 214B, and LED light sources 202A and 202C can be aimed at the common area 216 and angled 15 degrees or less from the respective longitudinal axes 214A and 214C, for example), which maintains an ideal relative intensity profile of each LED light source between 90 and 100%. As noted above, the angle of the respective chambers 207A and 207C, the distances of the LED's from the common area (to the left or the right when looking at FIG. 2), and the surfaces—whether angled or not—where the LED light sources 202A and 202C are positioned—each effect the relative intensity profile of each LED light source 202A and 202C.

The structural configuration and functionality of the power toothbrush projected display system 200 discussed above allows for multiple display configurations and provides for a variety of brushing information/indications to a user of a power toothbrush (as described above).

Figures 4A, 4B, 4C:
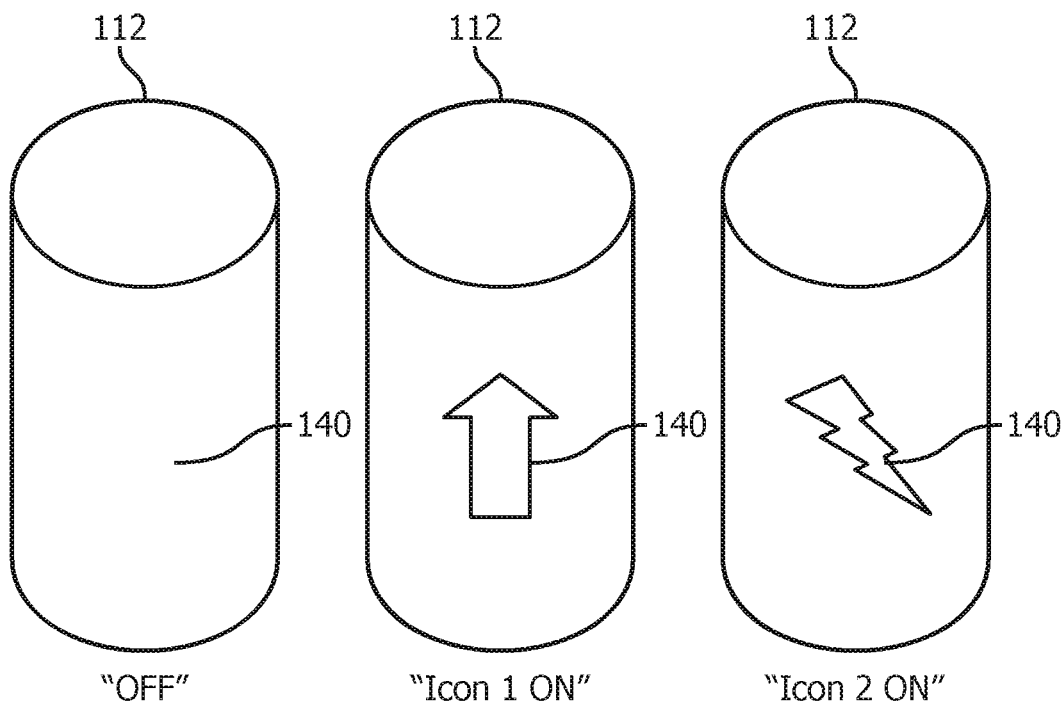
FIGS. 4A-4C are schematic representations of a power device having a projected display system in accordance with an embodiment.

Referring to FIGS. 4A-4C, multiple sequential icons/images are shown displayed on the same common area of a tubular body of a power device. For example, body portion/handle 112 includes a display area 140 that is in the "off" position in FIG. 4A. In FIG. 4B, icon/image 1 (an up arrow) is shown as being on and projected at the display area 140. In FIG. 5C, a separate icon/image 2 (a lightning bolt) is shown as being on and projected at the display area 140. Icon/image 2 can be projected at the display area 140 after icon/image 1 is turned off, and vice versa.

Figures 5A, 5B:
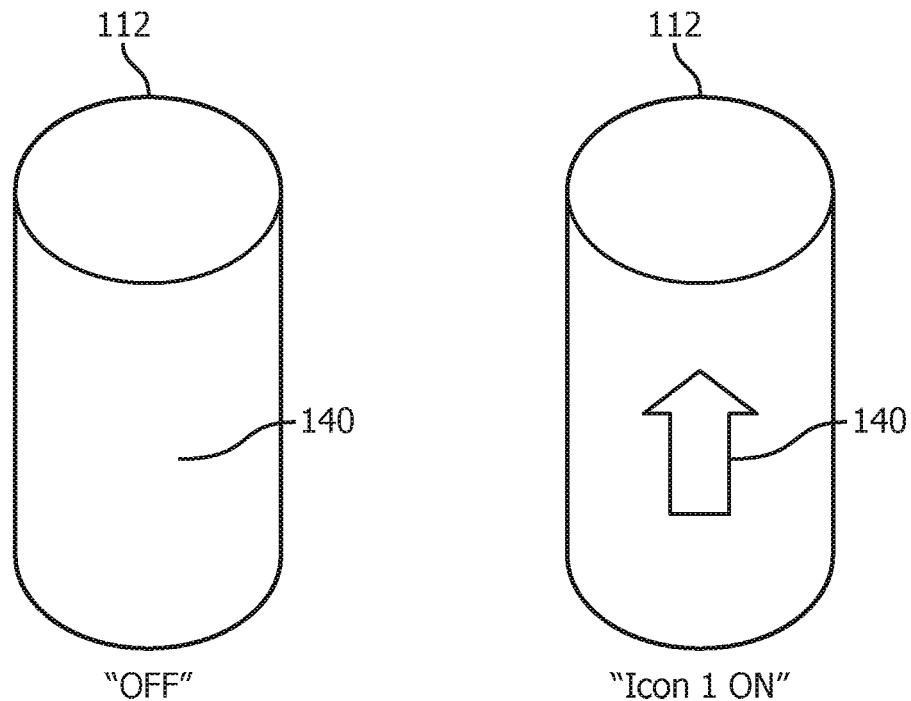
FIGS. 5A-5D are schematic representations of a power device having a projected display system in accordance with an embodiment.
Figure 5C:
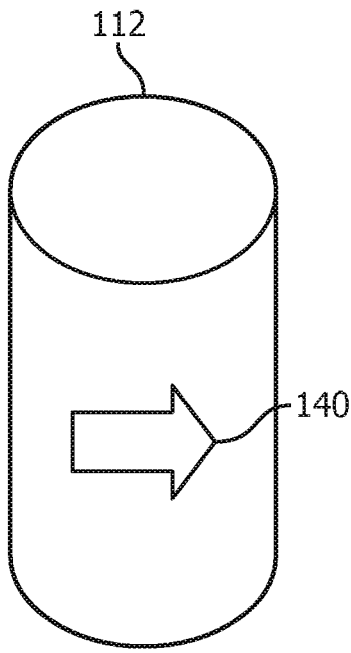
Figure 5D:
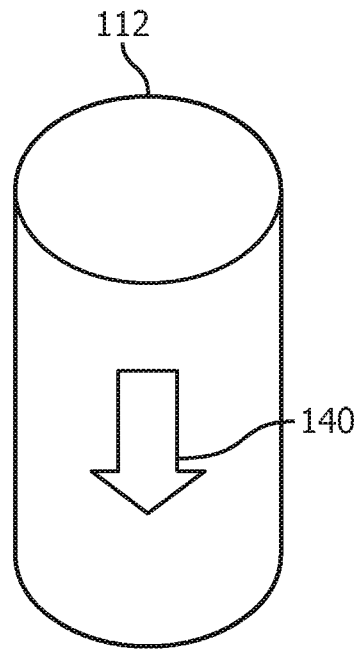

Turning to FIGS. 5A-5D, fading/transitioning icons/images are shown displayed on the same common area of a tubular body of a power device. For example, body portion/handle 112 includes a display area 140 that is in the "off" position in FIG. 5A. In FIG. 5B, icon/image 1 (an up arrow) is shown as being on and projected at the display area 140. In FIG. 5C, a different icon/image 2 (a right facing arrow) is shown as being on and projected at the display area 140. Icon/image 2, however, retains a portion of icon/image 1, and thus, the portions of icon image 2 that are different from icon/image 1 can gradually fade or transition to related icon/image 2. Similarly, in FIG. 5D, icon/image 3 is shown retaining a portion of icon/image 1 and/or icon/image 2, and thus, the portions of icon image 3 that are different from icon/image 1 or 2 can gradually fade or transition to related icon/image 3. The order of the fading or transition of icons/images as shown in FIGS. 5B and 5D can vary, and the color of each of the icons/images can fade or transition into the color of another icon/image.

Figure 6A:
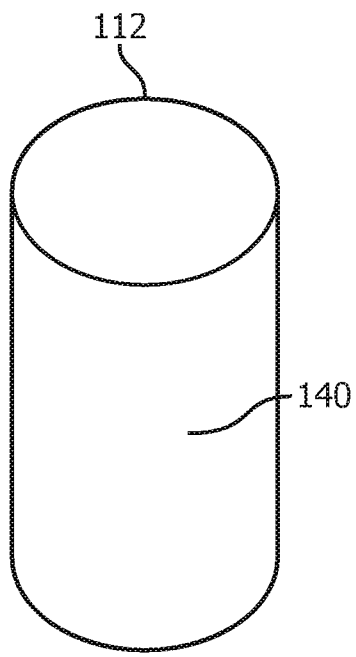
FIGS. 6A-6C are schematic representations of a power device having a projected display system in accordance with an embodiment.
Figure 6B:
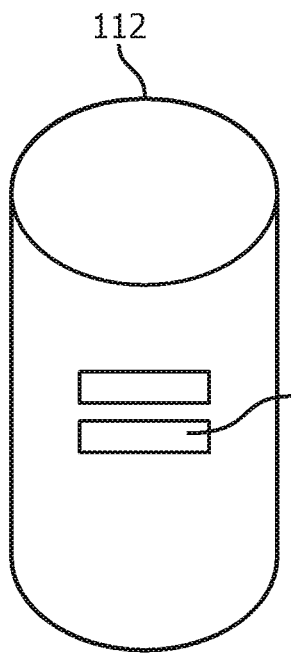
Figure 6C:
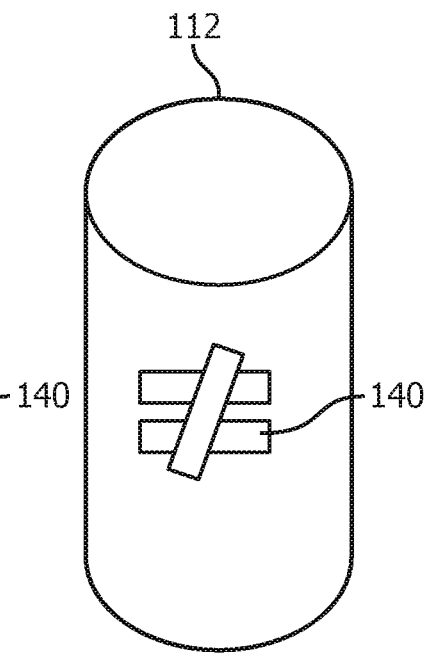

Referring to FIGS. 6A-6C, merging/blending icons/images are shown displayed on the same common area of a tubular body of a power device. For example, body portion/handle 112 includes a display area 140 that is in the "off" position in FIG. 6A. In FIG. 6B, icon/image 1 (equal sign) is shown as being on and projected at the display area 140. In FIG. 6C, an additional icon/image 2 (a slash) is shown as being on and projected over icon/image 1 at the display area 140. The color of one of the icons/images can merge/blend with the color of the other icon/image.

Even though a number of exemplary embodiments of icons/images are shown and described herein, many other icons/images are contemplated that could provide the user of the power device with information/indications about the device or use thereof. Moreover, similarly to the icons/images discussed above, a single color, fading or transitioning colors, and/or merging or blending colors could provide the contemplated information/indications.

Figure 7:
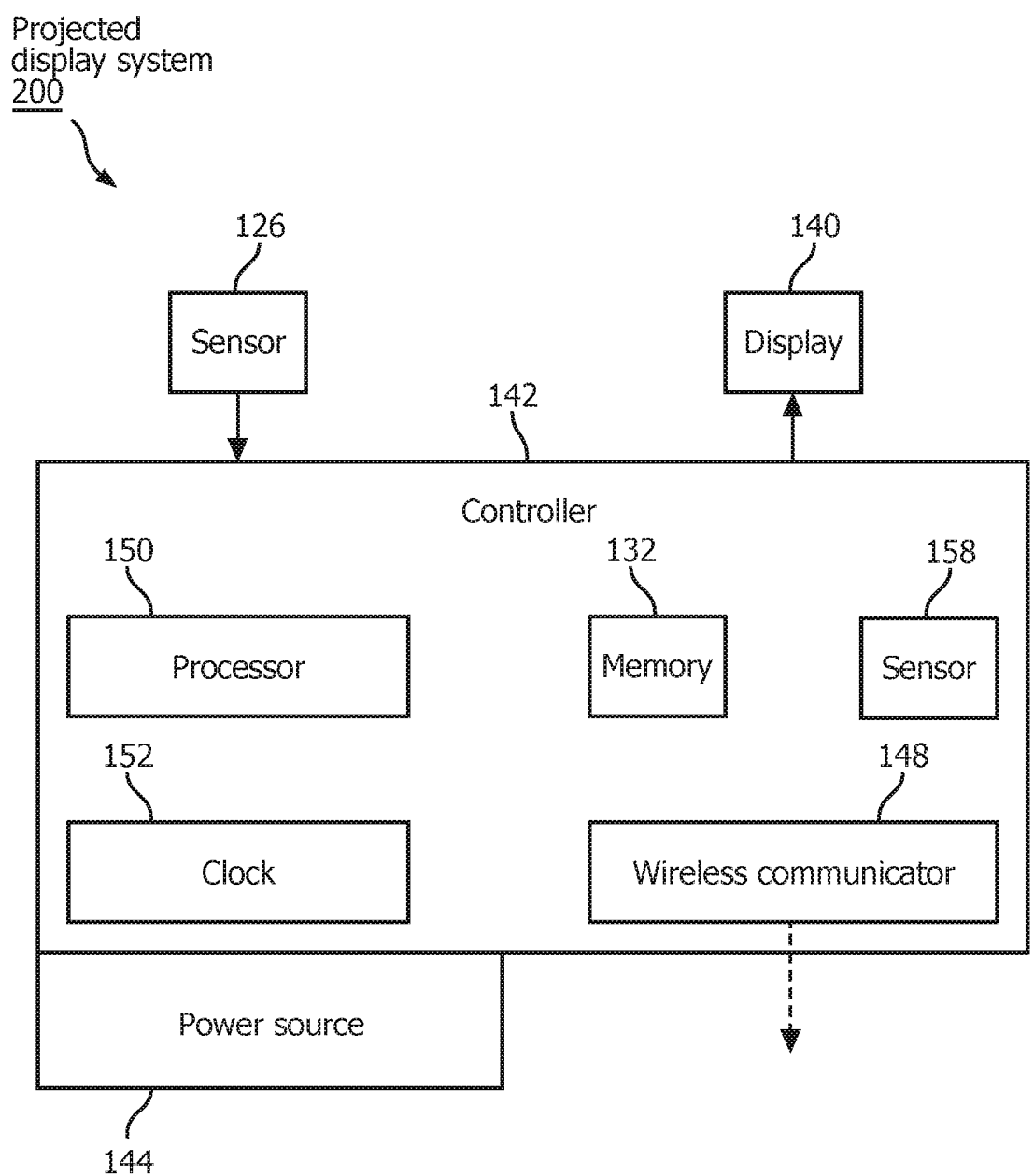
FIG. 7 is a schematic representation of a projected display system of a power toothbrush in accordance with an embodiment.

Referring to FIG. 7, a schematic representation of the basic control components of projected display system 200 is provided. As described herein, projected display system 200 can be programmed and/or configured to direct light emitted from one or more LED light sources within a housing of a power device through multiple image sources to project one or more images on a common area of an outer surface of the housing. According to an embodiment, the control components of projected display system 200 can include a controller 142 that is programmed and/or configured to analyze information/data, transmit/receive information, data and/or commands (control signals) from/to each of the other respective components of the projected display system 200 or external components/devices as may be appropriate to carry out the functions and methods described herein (as should be appreciated and understood by those of skill in the art in conjunction with a review of this disclosure). Information/data that can be analyzed and/or used by the controller 142 to carry out the functions and methods described herein can be received from one or more sensor components, and the controller 142 can be programmed and/or configured to effectuate the projection of one or more images on a common area of an outer surface of a housing (as described herein) as a result of the received (and optionally thereafter analyzed) information/data. from the one or more sensors.

According to a further embodiment, the control components of projected display system 200 can also include, for example, a sensor 126, a power source 144, and display 140. Power source 144 may be the same as power source 122 for the toothbrush 100, or can be a separate power source. Sensor 126 can be any of the sensors described or otherwise envisioned herein, and is programmed and/or configured to obtain sensor data regarding one or more aspects of the user's mouth during a brushing session. For example, the sensor may obtain information/data about the teeth surface, plaque levels, brushing areas, brushing strength, brushing angle, overall brushing effectiveness, and/or a wide variety of other aspects of dental health as described elsewhere herein. The sensor data may also relate to the operating status (on/off condition, normal condition, abnormal condition, battery life, and speed of the motor) of the power toothbrush 100 itself and other related data.

Controller 142 can receive the sensor data from sensor 126 in real-time or periodically. For example, sensor 126 may send a constant stream of sensor data to controller 142 for storage and/or analysis, or may temporarily store and aggregate or process data prior to sending it to controller 142. Once received by the controller, the sensor data from the brushing session can be processed by processor 150. Processor 150 may be the same as processor 130, or can be a separate processor. According to an embodiment, the processing can comprise one or more of the steps of: (i) normalizing or otherwise processing the sensor data for further analysis; (ii) retrieving stored pre-programmed or user-defined brushing standards from memory 132 (which can be inputted into the power toothbrush 100 as should be appreciated by a person of ordinary skill in the art in conjunction with a review of this disclosure); (iii) comparing the sensor data to the retrieved standards; (iv) determining if there are any sensor data that differ sufficiently (beyond a pre-defined threshold) from the retrieved standards; (v) determining whether the differing sensor data. triggers an output to the user based on the stored standards; and (vi) outputting data to the user in the form of a projection to the display 140 regarding the triggering sensor data. In other words, sensor data can be compared to pre-programmed standards to determine if a particular image is to be projected on a common area of an outer surface of the housing (e.g., display area 140) is warranted. Additionally, the timing of the projection of a particular image on a display area 140 can be in real time, or periodically.

As one example, the sensor data can be brushing strength, or information about how hard, how soil, and/or how effectively the user is brushing her teeth. The controller 142 can determine, using sensor data, how hard the user is brushing her teeth. Processor 150 can pull pre-programmed brushing strength levels from memory 132 and compare that to the obtained sensor data to determine that the user is not brushing her teeth sufficiently hard. In other words, the strength levels obtained from the sensor data fall beneath a pre-determined minimum threshold of strength levels for that user and/or that time of day. For example, different users and different times of day or different days of the week may require different brushing strength levels, and each of these can be stored in memory 132 for appropriate recall. Clock 152 may be utilized by controller 142 in order to determine the brushing time, duration, and date, and may be utilized by controller 142 in order to recall the appropriate standards from memory 132. Processor 150 can further determine, based on stored information, what response may be necessary for improper brushing strength levels, and can pull from memory 132 the appropriate image to be projected on display 140. For example, if the brushing strength is too low, the controller 142 can be programmed and/or configured to effectuate the selective projection of the up arrow as shown in and described with respect to FIG. 5B (to indicate to the user to increase his/her brushing strength) on display 140.

Projected display system 200 may also include a wireless communicator 148 for transmitting sensor data to a wireless transceiver (not shown). For example, wireless communicator 148 may transmit sensor data via a WiFi connection over the Internet or an Intranet to a dental professional, a database, or other location. Alternatively, wireless communicator 148 may transmit sensor data. via a Bluetooth or other wireless connection to a local device, database, or other transceiver. A wireless communicator 148 allows the user to save sensor data for long-term storage, to transmit sensor data for further analysis, or share data with a dental professional, among other uses. Wireless communicator 148 may also be a transceiver that can receive user input information, including the above referenced standards (as should be appreciated by a person of ordinary skill in the art in conjunction with a review of this disclosure).

Projected display system 200 may also include sensor 158 configured to detect that the user has picked up the toothbrush or removed it from a cradle and is about to use the toothbrush and can then activates the projected display system 200. The sensor 158 can be, for example, a motion sensor that detects that the toothbrush is being picked up and/or positioned for use. For example, the sensor 158 may detect motion using a variety of different motion-detecting sensors, and can send a signal to the processor 150 that the user has picked up the toothbrush and that an appropriate image can be projected on display 140 as may be appropriate during a brushing event (although, information about the power toothbrush 100 itself (such as charging status) can be sensed by either sensor 126 or 158 and projected on display 140 at any time).

According to an embodiment, historically gathered data may be sensed by sensor 126 and/or sensor 158, gathered and stored in memory 132. For example, a toothbrush may contain memory which can store, for example, an average value per day (e.g., brushing strength), week, month, etc. A particular image can be projected on display area 140 indicating to the user that his/her brushing strength has improved or has become worse over time.

Figure 8:
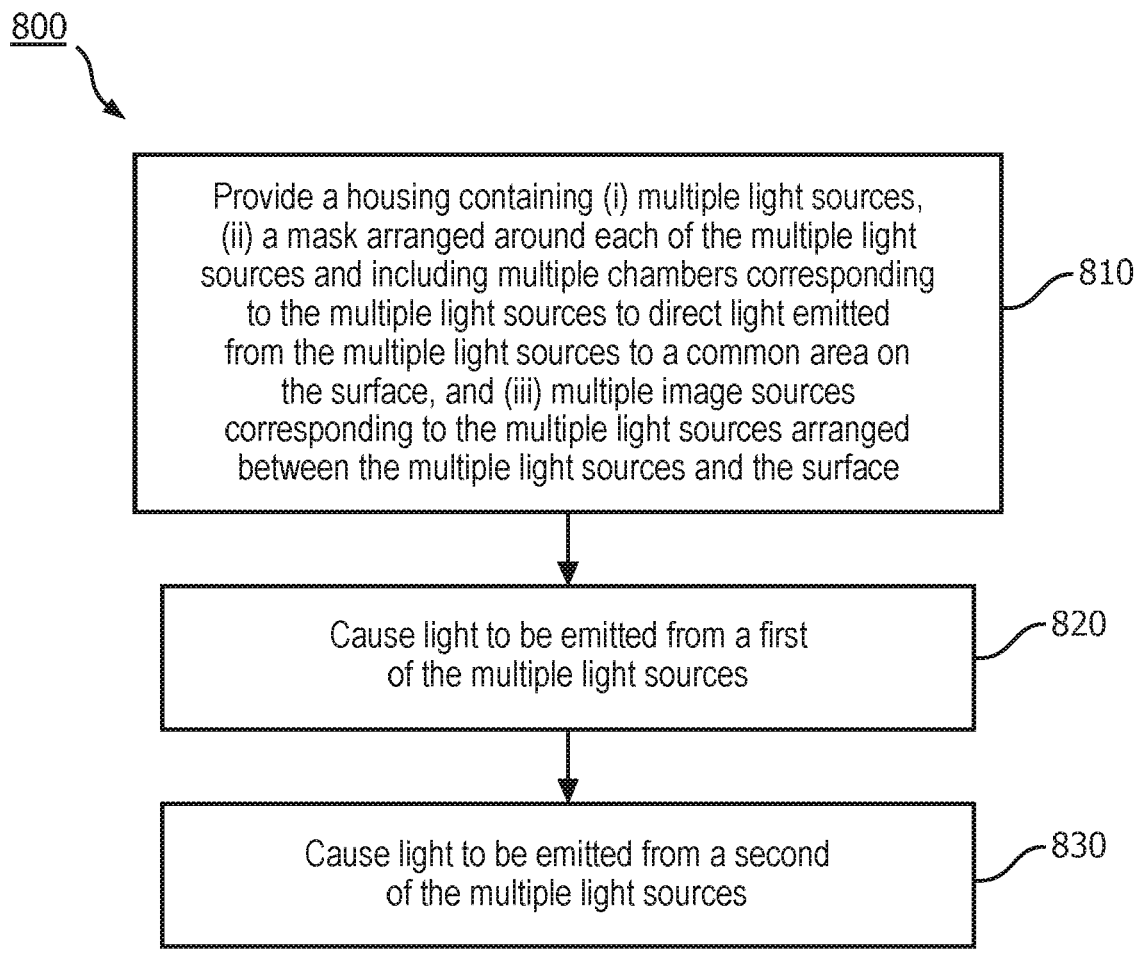
FIG. 8 is a flow chart of a method for selectively displaying images on a surface of a housing in accordance with an embodiment.

Referring to FIG. 8, a flow chart illustrating a method 800 for selectively displaying images on a surface of a housing in accordance with an embodiment is disclosed. In step 810, a housing is provided. The housing of step 810 may be contain the following: (i) multiple light sources, (ii) a mask arranged around each of the multiple light sources and including multiple chambers corresponding to the multiple light sources to direct light emitted from the multiple light sources to a common area on the surface, and (iii) multiple image sources corresponding to the multiple light sources arranged between the multiple light sources and the surface. In step 820, light from a first of the multiple light sources is emitted. The emitted light from the first of the multiple light sources can reach a corresponding first image source before reaching the surface, and can project a corresponding first image on the common area on the surface. In step 830, light from a second of the multiple light sources is emitted. The emitted light from the second of the multiple light sources can reach a corresponding second image source before reaching the surface, and can project a corresponding second image on the common area on the surface. The combination of the first and second images can create a blended image on the common area on the surface. Alternatively, the first image can fade out while the second image fades in on the common area on the surface, or the second image can be projected on the common area on the surface after the projection of first image on the common area has either stopped or not started.

Figure 9A:
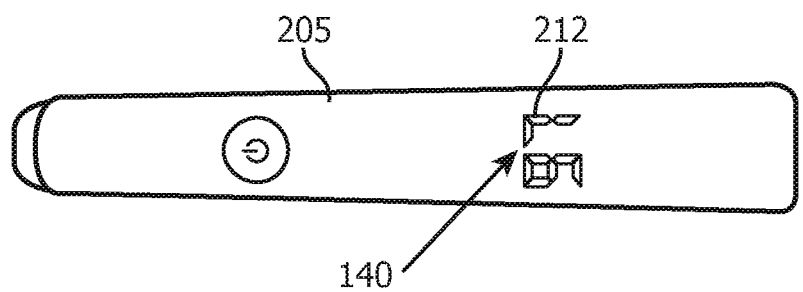
FIG. 9A is a photograph of a power device housing with a display showing the image of a number "97" in accordance with an embodiment.
Figure 9B:
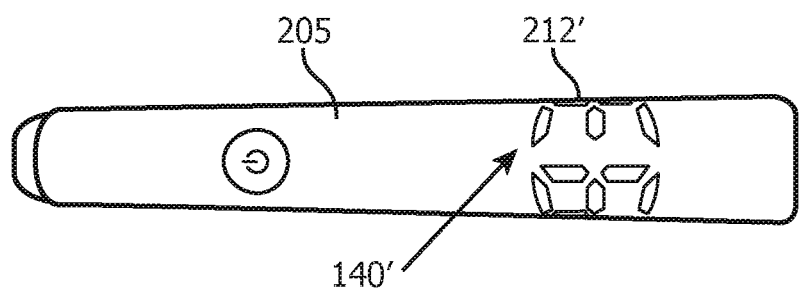
FIG. 9B is a photograph of a power device housing with a display showing the image of a number "93" at least partially wrapped around the curved outer surface of the housing in accordance with an embodiment.

Referring to FIG. 9A, a photograph of a power device housing 205 is provided with a display 140 showing the image 212 of a number "97." Referring to FIG. 9B, a power device housing 205 is shown with a display 140' showing the image 212' of a number "93." Unlike the image 212 of FIG. 9A, image 212' of FIG. 9B is shown at least partially wrapping around the curved outer surface of housing 205— providing a large angle display. This "wrapping" feature can be accomplished by a mask arrangement that directs light emitted from the multiple light sources in a diverging manner to separate areas on the curved outer surface of the housing. Alternatively, the outer surfaces of the housing could include at least one flat surface. Stated differently, the masks that surround and form the chambers that house each of the light sources can be angled in a particular manner/configuration within the housing 205 to provide the "wrapping" feature (by, in part, projecting an image corresponding to an image source in separate areas on the curved outer surface of the housing 205).

Figure 9C:
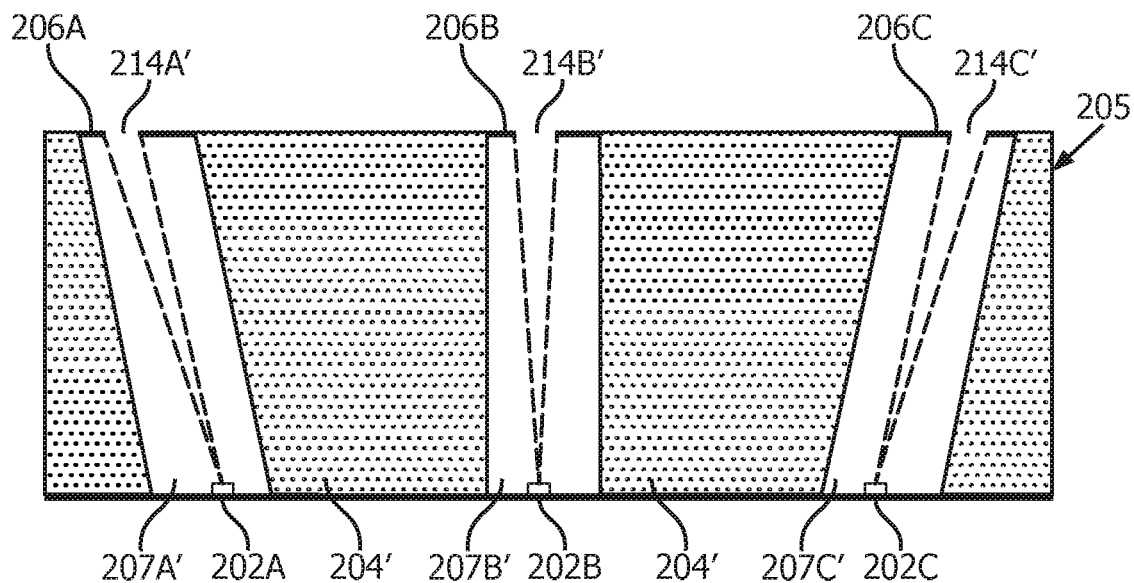
FIG. 9C is a sectional view of the projected display system within the power device housing shown in FIG. 9B in accordance with an embodiment.

Referring to FIG. 9C, a sectional view of the projected display system within the power device housing 205 shown in FIG. 9B is provided. FIG. 9C is similar to FIG. 2, except that chambers 207A' and 207C' in FIG. 9C are positioned at diverging angles as opposed to converging angles as shown in FIG. 2. The chamber configuration shown in FIG. 9C is formed by mask 204', which assists with directing light 214A' and 214C' in a diverging manner to obtain the image 212' of FIG. 9B that is at least partially wrapped around the curved outer surface of housing 205.

Figure 10A:
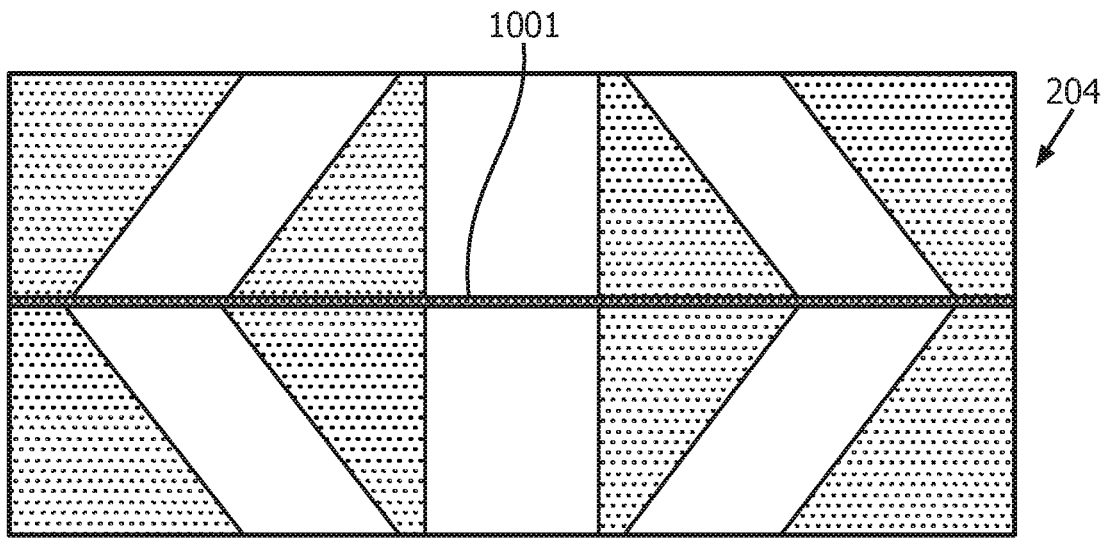
FIGS. 10A-C are schematic representations of embodiments of the injection molding and assembly of a mask portion of a projected display system in accordance with an embodiment.
Figure 10B:
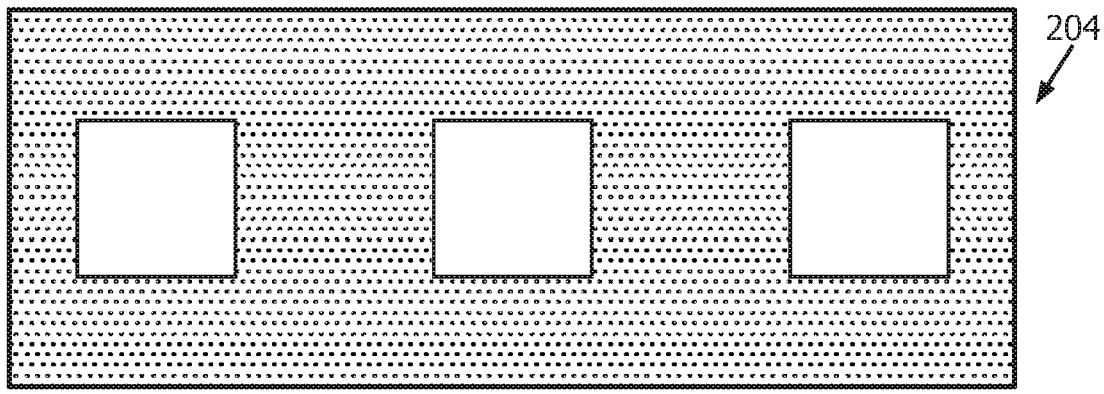
Figure 10C:
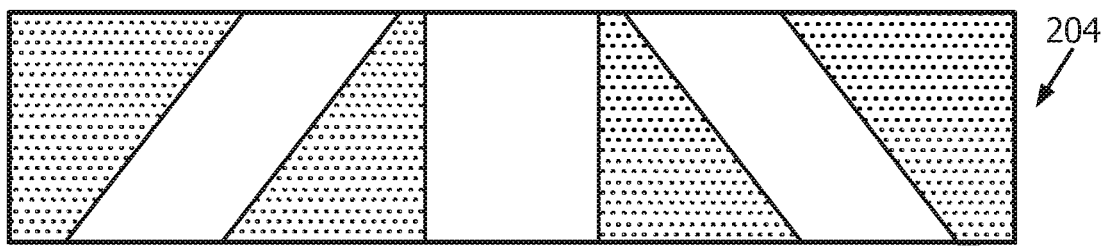

Referring to FIGS. 10A-C, schematic representations of embodiments of the mask 204 of the projected display system 200 are shown, which can be formed by injection molding. As shown by FIG. 10A, the mask 204 is injection molded in an open position (where the hinge is shown at 1001). It can be advantageous to injection mold the mask 204 in the open position, as it is easier to remove the mask from the mold. After removal, the mask 204 can be assembled by folding the open portions of the mask together. A closed bottom view of the mask 204 is shown post-injection molding in FIG. 10B, where the mask 204 was formed into the closed configuration per a folding assembly. A cross section of a final configuration of the mask 204 post-production and assembly is shown in FIG. 10C (which is the configuration that is also shown in FIG. 2).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A power device comprising:
    multiple light sources arranged in a housing;
    a mask arranged around each of the multiple light sources in the housing and including multiple chambers corresponding to the multiple light sources to direct light emitted from the multiple light sources to a common area on an outer surface of the housing; and
    multiple image sources corresponding to the multiple light sources arranged between the multiple light sources and the outer surface of the housing, light emitted from each of the multiple light sources reaching a corresponding image source before reaching the surface of the housing and projecting a corresponding image on the common area on the surface of the housing;
    wherein the multiple light sources are arranged on a flat substrate within the housing and an optical axis of at least one light source of the multiple light sources is orthogonal to the flat substrate such that the light from the at least one light source reaches the corresponding image source before reaching the surface of the housing and projecting the corresponding image on the common area on the surface of the housing.

2. The power device of claim 1, wherein the multiple light sources are light emitting diodes having limited angle dependent intensity profiles.

3. The power device of claim 1, further including a controller configured to selectively emit light from one or more of the multiple light sources to selectively project different images (Icon 1, Icon 2) of the multiple image sources on the common area on the outer surface of the housing.

4. The power device of claim 3, wherein the controller is configured to emit light from two or more of the multiple light sources to project a blended image (Icons 1 and 2) on the common area on the outer surface of the housing.

5. The power device of claim 3, wherein the controller is configured to (i) fade-out light emitted from a first of the multiple light sources corresponding to a first image (Icon 1) of the multiple image sources and (ii) fade-in light from a second of the multiple light sources corresponding to a second image (Icon 2) of the multiple image sources to create a fade effect from the first image to the second image on the common area on the outer surface of the housing.

6. A method for selectively displaying images on a surface of a housing, comprising the steps of:
    providing a housing containing (i) multiple light sources, (ii) a mask arranged around each of the multiple light sources and including multiple chambers corresponding to the multiple light sources to direct light emitted from the multiple light sources to a common area on the surface, and (iii) multiple image sources corresponding to the multiple light sources arranged between the multiple light sources and the surface wherein the common area is a portion of the surface of the housing; and
    causing light to be emitted from a first of the multiple light sources, the emitted light reaching a corresponding first image source before reaching the surface and projecting a corresponding first image on the common area on the surface;
    wherein the multiple light sources are arranged on a flat substrate within the housing and an optical axis of at least one light source of the multiple light sources is orthogonal to the flat substrate such that the light from the at least one light source reaches the corresponding image source before reaching the surface of the housing and projecting the corresponding image on the common area on the surface of the housing.

7. The method of claim 6, further comprising:
    causing light to be emitted from a second of the multiple light sources, the emitted light reaching a corresponding second image source before reaching the surface and projecting a corresponding second image on the common area on the surface, the combination of the first and second images creating a blended image on the common area on the surface.

8. The method of claim 6, further comprising:
causing light to fade-out from the first light source; and
causing light to fade-in from a second of the multiple light sources, the emitted light reaching a corresponding second image source before reaching the surface and projecting a corresponding second image on the common area on the surface, creating a fade effect from the first image to the second image on the common area on the outer surface of the housing.

9. The method of claim 6, further comprising:
causing light to stop being emitted from the first light source; and
causing light to be emitted from a second of the multiple light sources, the emitted light reaching a corresponding second image source before reaching the surface and projecting a corresponding second image on the common area on the surface, creating a switch from the first image to the second image on the common area on the surface.

10. The method of claim 9, wherein:
the first image and the second image are identical in shape;
the first light source is configured to emit light of a first color;
the second light source is configured to emit light of a second color, the first color being different from the second color; and
the switch from the first image to the second image results in a change in color of the projected image.

\* \* \* \* \*